(12) United States Patent
Wilson

(10) Patent No.: US 8,399,844 B2
(45) Date of Patent: Mar. 19, 2013

(54) DETECTOR ASSEMBLY

(75) Inventor: Lance J. Wilson, Shaker Heights, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 351 days.

(21) Appl. No.: 12/650,404

(22) Filed: Dec. 30, 2009

(65) Prior Publication Data

US 2010/0171039 A1    Jul. 8, 2010

Related U.S. Application Data

(60) Provisional application No. 61/141,906, filed on Dec. 31, 2008.

(51) Int. Cl.
*G01T 1/20* (2006.01)
(52) U.S. Cl. ......................................... 250/368
(58) Field of Classification Search .................. 250/368
See application file for complete search history.

(56) References Cited

U.S. PATENT DOCUMENTS

| | | | |
|---|---|---|---|
| 3,914,602 A | 10/1975 | Goldstein | |
| 3,950,647 A | 4/1976 | Piltingsrud | |
| 4,604,649 A * | 8/1986 | Carollo et al. | 378/98.5 |
| 4,649,276 A | 3/1987 | Suzuki | |
| 5,006,713 A * | 4/1991 | Miller et al. | 250/361 R |
| 6,364,524 B1 | 4/2002 | Markham | |
| 6,452,164 B1 | 9/2002 | Andarawis et al. | |
| 6,527,398 B1 | 3/2003 | Fetzer | |
| 2007/0262261 A1 * | 11/2007 | Liang | 250/368 |

FOREIGN PATENT DOCUMENTS

| | | |
|---|---|---|
| EP | 1645891 A1 | 4/2006 |
| WO | 2007/008932 A2 | 1/2007 |
| WO | 2007/085060 A1 | 8/2007 |
| WO | 2008/081179 A2 | 7/2008 |

OTHER PUBLICATIONS

[Retrieved on Feb. 2, 2012] RadioMuseum, 931B, Tube 931B; Rohre 931B ID45745, Photomutiplier, (http://www.radiomuseum.org/tubes/tube_931b.html).*
Holocomb, David, E., "Hollow-Core Light Guide and Scintillator Based Near-Core Temperature and Flux Probe," IAEA TEchnical Meeting on Impact of Mondern Technology on Instrumentation and control in Nuclear Power Plants, Sep. 13-16, 2005, Chatou, FR, http://www.ornl.gov/sci/scale/pubs/holcomb%20paper.pdf, 9 pgs.

* cited by examiner

*Primary Examiner* — David Porta
*Assistant Examiner* — Hugh H Maupin
(74) *Attorney, Agent, or Firm* — Abel Law Group, LLP; Robert T. Conway

(57) ABSTRACT

A detector made of a detector assembly including a detector housing comprising a reflective interior surface relative to a wavelength of fluoresced electromagnetic radiation, and a scintillator contained within the detector housing. The detector further including a photomultiplier tube (PMT) coupled to the detector housing, wherein a portion of the PMT is contained within the detector housing.

20 Claims, 3 Drawing Sheets

DETECTOR ASSEMBLY

CROSS-REFERENCE TO RELATED APPLICATION(S)

The present application claims priority from U.S. Provisional Patent Application No. 61/141,906, filed Dec. 31, 2008, entitled "Detector Assembly," naming inventor Lance J. Wilson, which application is incorporated by reference herein in its entirety.

BACKGROUND

1. Field of the Disclosure

The following is directed to a detector assembly, and particularly directed to a radiation detection housing incorporating a scintillator crystal and photomultiplier tube therein.

2. Description of the Related Art

Detector devices are used in a variety of industrial applications, for example, well logging in the oil and gas industry, and monitoring of background radiation levels. Scintillation detectors are useful because they are capable of measuring certain types of particle emissions, such as gamma rays, neutrons, alpha particles, and beta particles emitted from different source materials.

Scintillators, which can be crystalline materials, are effective for detecting certain types of radiation, but can be sensitive components. As such, they are typically contained within a casing, which for some applications can be ruggedized, that is connected to a window at one end to permit radiation-induced (i.e., fluoresced) scintillation light to pass out of the casing, to a connected light pipe. The light pipe is a solid article, generally made of glass or acrylic, capable of directing fluoresced radiation to a light-sensing device such as a photomultiplier tube (PMT) that is connected to the light pipe. The photomultiplier tube converts the fluoresced light emitted from the crystal into electrical pulses, which are shaped and digitized by associated electronics and may be registered as counts that are transmitted to analyzing equipment.

Such devices can be burdensome and complex, resulting in assemblies that are difficult to maintain.

SUMMARY

According to one aspect a detector includes a detector assembly having a detector housing comprising a reflective coating on interior surfaces of the detector and a scintillator contained within the detector housing, and a photomultiplier tube (PMT) coupled to the detector housing, wherein a portion of the PMT is contained within the detector housing.

According to another aspect, a detector includes a detector assembly having a detector housing, a scintillator contained within the detector housing, and a selective transmission layer overlying the scintillator.

According to a third aspect, detector including a rigid detector assembly having a detector housing, wherein a majority of the volume within the detector assembly is open, a scintillator contained within the detector housing, and a photomultiplier tube (PMT) coupled to the detector housing. The PMT is contained within the detector housing, and wherein the rigid detector assembly comprises a density of not greater than about 0.8 g/cm$^3$.

In another aspect, a detector includes a rigid detector assembly having a detector housing, wherein a majority of the volume within the detector assembly is open, a scintillator contained within the detector housing, and a photomultiplier tube (PMT) coupled to the detector housing, wherein the scintillator and PMT are separated by open space.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

The following description is directed to detectors, and more particularly, detectors suitable for monitoring applications, including applications directed to the detection of alpha and beta particles for personnel and equipment. The detectors herein generally include a detector housing that is suitable for containing a scintillator and least a portion of a photomultiplier tube (PMT) such that certain types of radiation can be detected when the radiation interacts with the scintillator.

Figure 1:
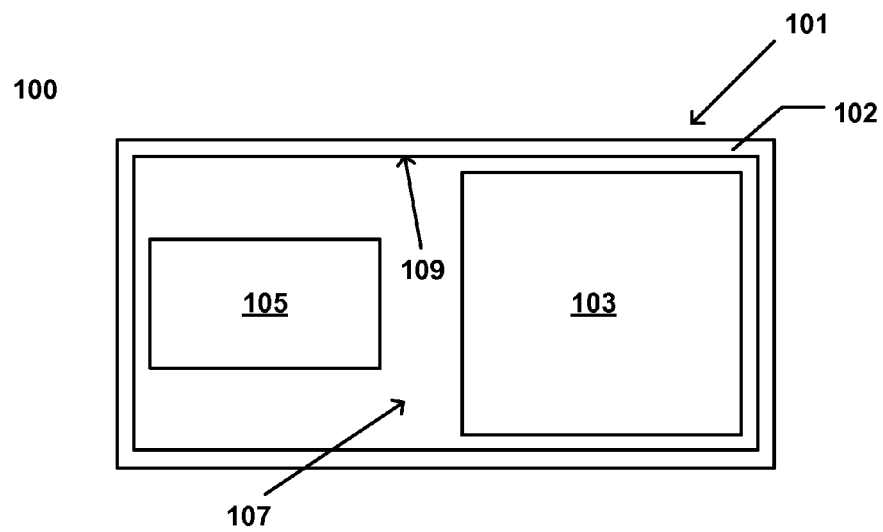
FIG. 1 includes an illustration of a detector in accordance with an embodiment.

FIG. 1 includes an illustration of a detector assembly in accordance with an embodiment. In particular, the detector assembly 100 includes a detector housing 101, a scintillator 103 contained within the detector housing 101, and a photomultiplier tube (PMT) 105 at least partially contained within the detector housing 101. Notably, the detector housing 101 can be a unitary article, containing the scintillator 103 and the PMT 105 in the same sealed casing, rather than separate sealed housings as with traditional designs. Moreover, the detector housing 101 can be a light pipe, which is an article capable of capturing and directing particular wavelengths of radiation within the interior.

The detector housing 101 can include a detector body 102 having a reflective interior surface 109 such that particular wavelengths of electromagnetic radiation (or "light"), such as those wavelengths of electromagnetic radiation fluoresced by the scintillator 103 are reflected within the interior of the detector housing 101 until the radiation is detected by the PMT 105. In certain instances, the inner surfaces 109 of the detector housing body 102 can be processed or coated with a reflective coating including an organic material, inorganic material, or a combination thereof. Additionally, the reflective coating can include multiple layers of materials. For instance, in one embodiment, the reflective coating can include a first layer of material, such as a white paint, followed by application of a reflective tape overlying the white paint. Some suitable reflective tapes may include polymer materials or metal materials. For example, some suitable polymer materials can include polyethylene, acrylic, or a combination thereof. A suitable metal material may include aluminum.

Generally, a majority of the surface area of the interior surfaces of the detector housing body 102, generally including four sides and a bottom surface connected to the four sides, can be reflective to the wavelength of radiation fluoresced by the scintillator 103. In fact, certain embodiments utilize a detector housing 101 wherein at least 60% of the surface area of the interior surfaces are reflective. Other detectors utilize a greater percentage, such as at least about 70%, at least about 80%, at least about 90%, or even at least about 95% of the total surface area of the interior surface of the detector housing 101. Particular embodiments use a detector body 102 wherein the entirety of the interior surfaces are reflective.

As further illustrated in FIG. 1, the detector housing 101 can be a substantially hollow article, such that a significant portion of the volume within the interior of the detector housing 101 is open. That is, a significant portion, and in some cases a majority of the volume, within the detector housing 101 does not contain a solid or liquid substance, but can contain a gaseous substance or a vacuum. For example, in certain embodiments, at least about 30% of the total volume within the interior of the detector housing 101 is open space. According to other embodiments, a majority of the volume within the detector housing 101 can be open, such as not less than about 50%, not less than about 60%, or even not less than about 70%.

As such, the detector assemblies 100 herein have particularly low densities, especially in comparison to traditional detector assemblies. For example, in one embodiment, the density of the detector assembly 100 is not greater than about 0.8 g/cm$^3$. For certain other detectors, the density of the assembly 100 can be less, such as not greater than about 0.6 g/cm$^3$, not greater than about 0.5 g/cm$^3$, and on the order of about 0.4 g/cm$^3$ or 0.2 g/cm$^3$. Particular embodiments utilize an assembly 100 having a density within a range between about 0.2 g/cm$^3$ and about 0.7 g/cm$^3$, and more particularly within a range between about 0.3 g/cm$^3$ and about 0.5 g/cm$^3$.

As further illustrated in FIG. 1, the detector housing 101 is structured such that at least a portion of the PMT 105 (as shown, the entire PMT 105) is contained within the interior of the detector housing 101. Such a design facilitates close proximity between the scintillator 103 and the PMT 105 to reduce attenuation and losses with regard to detection of the electromagnetic radiation fluoresced by the scintillator. Moreover, such a design facilitates a compact and unitary detector assembly having the primary detection components contained within the single detector housing 101. In certain designs, the scintillator 103 can actually overlie a portion of the PMT 105, such that the two components are adjacent to each other. In some embodiments, the scintillator 103 and the PMT 105 are adjacent to each other such that there are no components disposed between them. More particularly, the scintillator 103 and the PMT 105 can be abutting, such that at least one surface of the scintillator 103 is in direct contact with a surface of the PMT 105, without any intervening components.

Notably, the PMT 105 and scintillator 103 can be separated by a gap 107 that can be open space. The gap 107 can be occupied by a gaseous species or a vacuum as opposed to a solid or liquid component, such as often the case when using a solid light pipe material at an end of the PMT 105, like an acrylic material.

Figure 2:
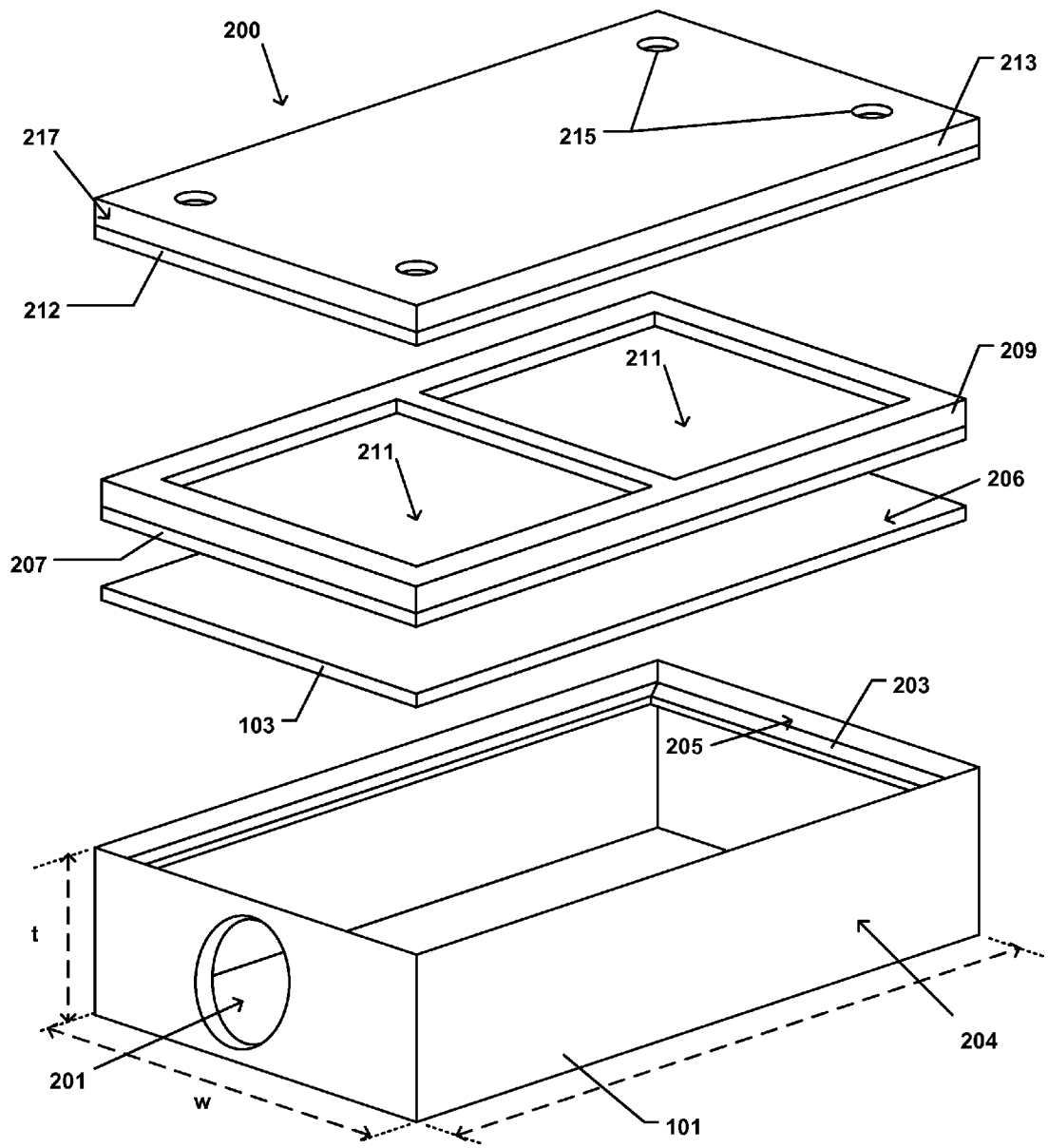
FIG. 2 includes a perspective view of components within the detector in accordance with an embodiment.

FIG. 2 includes a perspective view of components within a detector assembly in accordance with an embodiment. As illustrated in FIG. 2, the detector assembly 200 can include a detector housing 101, a scintillator 103, a frame 209, and a bezel 213, in accordance with an embodiment. With particular reference to certain components, the detector housing 101 can include a detector body having a generally rectangular shape including a length (l), a width (w), and a thickness (t) wherein the length is greater than or equal to the width and the width is greater than or equal to the thickness.

The length of the detector body is generally at least about 5 cm. In particular embodiments, the length of the detector body can be at least about 10 cm, at least about 15 cm, at least about 20 cm, or even at least about 30 cm. Particular embodiments utilize a detector body having a length within a range between about 20 cm, and about 40 cm. Generally, the width of the detector body is least about 1 cm, and more typically, at least about 3 cm. Other embodiments can use a body having a greater width, such as at least about 5 cm, at least about 10 cm, at least about 15 cm or even at least about 20 cm, and particularly within a range between about 5 cm and about 30 cm. Moreover, the thickness of the detector body can be at least about 2 cm, such as at least about 3 cm, or at least about 5 cm. Particular embodiments utilize a thickness within a range between about 2 cm and about 8 cm. While a generally rectangular body is illustrated, further designs can incorporate other shapes such as a cylindrical body or other polygonal shape.

The volume of the detector housing 101 is generally on the order of at least about 50 cm$^3$. Still, particular embodiments may utilize a larger detector housing 101, such that the volume is at least about 50 cm$^3$, such as at least about 500 cm$^3$, such as at least about 1000 cm$^3$, at least about 1500 cm$^3$, or even at least about 2000 cm$^3$. Particular embodiments may utilize a volume within a range between about 50 cm$^3$ and about 4000 cm$^3$, and more particularly between about 500 cm$^3$ and about 4000 cm$^3$.

The detector housing 101 can be a rigid article, such as a rigid frame construction that can be made of an organic or inorganic material. For example, inorganic materials including metals or metal alloys, and particularly light-weight, low density metals, such as aluminum or stainless steel. In fact, certain designs utilize metals having a density of not greater than about 6 g/cm$^3$, such as not greater than about 5.5 g/cm$^3$, not greater than about 5 g/cm$^3$, or even not greater than about 4 g/cm$^3$, and particularly within a range between about 2 g/cm$^3$ and about 4 g/cm$^3$ are particularly suitable.

In other embodiments, the detector housing 101 can be made of an organic material, such as a polymer. Suitable polymers can include thermoplastic polymers. For example, suitable thermoplastic polymer materials can include styrene containing polymers. In accordance with one particular embodiment, the detector housing 101 comprises acrylonitrile butadiene styrene (ABS) polymer material, and in fact, can be made entirely of ABS polymer material.

The detector housing 101 can include outer surfaces 204 extending around the outer periphery of the body which may be coated by an absorptive (i.e., non-reflective) material, such that the detector housing 101 is "light-tight" with respect to certain wavelengths of electromagnetic radiation. The coating of absorptive material can reduce the likelihood of false counts by entry of unwanted, incident electromagnetic radiation from interacting with the scintillator 103, while allowing the entry of certain types of particle emissions (e.g., alpha particles or beta particles) into the detector housing 101 to interact with the scintillator 103. For example, in one embodiment, the outer periphery of the detector housing 101 can be coated with a black material, such as electrical tape, caulking material, or an epoxy. Placement of such material is most suitable along seams adjoining components together, such as between the detector housing 101 and the bezel 213.

As further illustrated in FIG. 2, the detector housing 101 can include an opening 201 extending through a side of the detector housing 101 for engagement with the PMT 105 therein, such that the PMT 105 can extend into the interior of the detector housing 101. In fact, the PMT 105 can be held in the opening 201 via a bracket (not illustrated) that can be affixed to the detector housing 101 for proper placement of the PMT 105 relative to the components of the detector housing 101. Additionally, an absorptive material can be placed around the opening 201 after engagement of the PMT 105 therein to reduce the introduction of various types of electromagnetic radiation into the interior of the detector housing 101.

The detector assembly 200 also includes a scintillator 103. In particular, the scintillator 103 can have a shape suitable such that it fits within the detector housing 101. According to one embodiment, the scintillator 103 can be contained and disposed along a shelf 203 within the inner surface 205 of the detector housing 101. It will be appreciated, that while the shelf 203 illustrated in FIG. 2 is suitable for securing the scintillator 103 as illustrated, for other types, sizes, and shapes of scintillators, alternative fixtures and forms of securing the scintillator within the detector housing 101 can be used.

As further illustrated, the scintillator 103 has a size, and more particularly, an area defined by a length and width complementary to the length (l) and width (w) of the detector housing 101, such that the scintillator 103 has substantially the same area as the detector housing 101. As such, the scintillator 103 can have an area defined by the length and width that is not greater than about 5% different than the area of the detector housing 101. In other instances, this difference can be less, such as not greater than about 3%, not greater than about 2%, or even not greater than about 1%.

As shown in the illustrated embodiment of FIG. 2, the scintillator 103 can be a generally rectangular-shaped body including a length, width, and thickness. According to one embodiment, the length is greater than or equal to the width, and the width is greater than or equal to the thickness. In more particular instances, the ratio of length to width (l:w) is at least about 2:1, such as at least about 3:1, at least about 4:1, or even at least 5:1. Particular embodiments utilize a ratio of length to width within a range between about 2:1 and about 5:1.

Moreover, a particular ratio between the width and thickness may exist. For instance, the scintillator 103 can be in the shape of a sheet or layer of material such that it is particularly thin, and having a ratio between width and thickness (w:t) of at least about 10:1. Other embodiments may utilize a greater ratio, such that the ratio between width and thickness is at least about 12:1, at least about 15:1, or even at least about 20:1.

According to embodiments utilizing a scintillator 103 in the form of a sheet or layer, the thickness can be not greater than about 2 mm. In other instances, the scintillator 103 can be thinner, such that the thickness is not greater than about 1.5 mm, not greater than about 1 mm or even not greater than about 0.5 mm. Particular embodiments utilize a thickness within a range between about 0.01 mm and about 1 mm.

While the scintillator 103 of FIG. 2 is illustrated as a single unitary piece, other embodiments may utilize one or more scintillators. Such designs can bond individual scintillators together to form a large scintillator article. Moreover, some embodiments can utilize more than one type of scintillator, for example the scintillator 103 can be a hybrid material. Designs having more than one type of scintillator material can aid the detection of different types of radiation.

Suitable scintillator materials can include solids, liquids and gels. For example, the scintillator 103 can include an inorganic material, such as halides, oxides, sulfides, or a combination thereof. Certain suitable halides can include activated lanthanum bromide, activated lanthanum chloride, activated sodium iodide, and activated cesium iodide. As will be appreciated, such scintillator materials may be crystalline materials.

In other embodiments, the scintillator 103 can include an organic material, such as a liquid or crystalline organic material. Suitable organic materials can include polymers, and particularly, polymers such as polyvinyl toluene, polystyrene, acrylics, anthracene, and a combination thereof. According to one particular embodiment, the scintillator 103 comprises polyvinyl toluene and is particularly suitable for the detection of beta emissions.

Such organic materials may be particularly suitable for detecting ionizing radiation particles, such as beta particles. Capturing of beta particles may be suitable for detecting isotopes such as $^{36}Cl$, $^{14}C$ and, $^{137}Cs$. While the alpha particle capture capabilities may be suitable for detection of isotopes such as $^{241}Am$, or radioactive elements such as uranium, thorium, actinium, radium, or the like.

In certain embodiments, the scintillator 103 can include a coating on one or more surfaces to facilitate the capture of additional types of radiation. For example, in the context of the embodiment of FIG. 2, a coating may be applied to the major surface 206 of the scintillator 103. Suitable coatings can include organic or inorganic compounds. Suitable inorganic compounds can include sulfides, and particularly may include zinc sulfide, especially for enhancing the sensitivity of the scintillator to alpha particles.

As such, the coating can have an average thickness of at least about 0.01 mm. In other instances, the coating may be more robust, such that it has an average thickness of at least about 0.25 mm, such as at least about 0.5 mm, and particularly within a range between about 0.01 mm and about 3 mm.

The detector assembly 200 can further include a frame 209 configured to overly the scintillator 103, such that portions of the scintillator 103 are disposed between the shelf 203 and frame 209 within the detector housing 101. As illustrated, the frame 209 can have dimensions suitable for being contained within the detector housing 101. The frame 209 can be made of an organic or inorganic material. For example, suitable inorganic materials can include metals or metal alloys, particularly light-weight metals, such as aluminum, aluminum containing alloys or even stainless steel. Certain organic materials can include those described with regard to the materials of the detector housing 101, such as thermoplastic polymer materials.

As further illustrated, the frame 209 can include windows 211 or openings within the body of the frame 209 for transmitting particular types of radiation to the scintillator 103. As illustrated, the windows 211 within the frame 209 can take up the majority of the frame 209 area thus maximizing the amount of incident particle emissions (e.g., alpha particles, beta particles, etc) transmitted to the scintillator 103. It will be appreciated that while the windows 211 are illustrated as openings within the frame 209, in other designs, windows can be formed within the detector housing 101. For example, the detector housing 101 can include windows within the body along different sides of the housing such that radiation can be received from multiple directions. Moreover, while the frame 209 illustrated includes two windows 211, other embodiments may utilize more or less openings.

The detector assembly 200 can further include a selective transmission layer 207 underlying the frame 209. In accordance with a particular embodiment, the selective transmission layer 207 is in direct contact with the frame 209, and more particularly, may be adhered to or affixed to the bottom surface of the frame 209 such that it is directly underlying and completely covering the openings defining the windows 211.

Notably, the selective transmission layer 207 is disposed between the windows 211 and the scintillator 103 and is intended to allow certain forms of radiation to transmit through the windows 211 to the scintillator 103, while at the same time the selective transmission layer 207 inhibits fluoresced radiation from the scintillator 103 escaping the detector housing 101. Accordingly, the selective transmission layer 207 traps the electromagnetic radiation fluoresced by the scintillator 103 until it is detected by the PMT 105. Accordingly, the selective transmission layer 207 may be in direct contact with a major surface 206 of the scintillator 103. It will be appreciated that in other embodiments utilizing other window configurations, it is suitable for a selective transmission layer 207 to be disposed between the scintillator and the windows. It will further be appreciated that a selective transmission layer 207 can be a layer of material, film, or coating, that may be placed on the exterior major surface of the window 211 opposite the major surface 206.

The selective transmission layer 207 can include an organic material, such as a polymer. Some suitable polymers can include thermoplastic polymer resins. In accordance with an embodiment, the selective transmission layer 207 is made of a thermoplastic polymer resin containing polyester. In one certain instance, the selective transmission layer 207 is formed such that it comprises polyethylene terephthalate (PET). In an even more particular embodiment, the selective transmission layer is formed such that it is made entirely of PET, which may include a biaxially oriented layer of PET.

The selective transmission layer 207 can have an average thickness for allowing transmission of the intended and detected radiation to transmit through to the scintillator 103 while maintaining radiation fluoresced from the scintillator 103 within the detector housing 101. For example, the selective transmission layer 207 can have an average thickness of at least about 0.05 mm. In other instances, the selective transmission layer 207 may have an average thickness of at least about 0.1 mm, such as at least about 0.25 mm, or even at least about 0.5 mm. Still, the selective transmission layer 207 generally has an average thickness that is not greater than about 2 mm, or not greater than about 1 mm. Particular embodiments utilize a selective transmission layer 207 having an average thickness within a range between about 0.05 mm and 2 mm, and more particularly, within a range between about 0.1 mm and about 1 mm. It will be appreciated that the selective transmission layer 207 can be one or more layers.

As further illustrated in FIG. 2, the detector assembly 200 can further include a bezel 213 configured to overlie and contain the scintillator 103, selective transmission layer 207, and frame 209 within the detector housing 101. Generally, the bezel 213 can have dimensions that are at least the size of the dimensions of the detector housing 101, and more particularly, may have dimensions slightly greater than the dimensions of the detector housing 101. The bezel 213 can be made of a light-weight, organic or inorganic material. For example, the bezel 213 can include a light-weight inorganic material, such as a metal or metal alloy having a density of not greater than about 6 g/cm$^3$. For example, some suitable metals can include aluminum, aluminum-containing alloys or stainless steel. Alternative embodiments may use an organic material, such as a polymer having sufficient rigidity to maintain compression and sealing of the components between the bezel 213 and the detector housing 101.

Additionally, as illustrated, the bezel 213 can include openings 215 for receiving fasteners for securing the bezel 213 to the detector housing 101. In accordance with an alternative embodiment, the bezel 213 may not include openings 215, and rather, can be attached to the detector housing 101 via an interference fit connection or a snap-lock connection. Such connection mechanisms between the bezel 213 and detector housing 101 facilitate a field-serviceable detector assembly that can be assembled rapidly and, more particularly, serviced within the field without a need to return the entire assembly to the manufacturer for maintenance. Still, according to certain alternative embodiments, the bezel 213 can be attached to the detector housing 101 via a sealant, such as an epoxy material.

As further illustrated in FIG. 2, the detector assembly 200 can include a gasket 212 underlying the bezel 213. In particular, the gasket 212 can be configured to be in direct contact with the underlying surface of the bezel 213 and can also be in direct contact with the upper surface of the frame 209. The gasket 212 facilitates a light-tight container for reducing the amount of incident radiation entering the detector housing 101 and fluoresced radiation from escaping the detector housing 101. As such, the gasket 212 can include an organic material, which may include a polymer. Moreover, the gasket 212 can be a particularly dark color.

Other features of the detector assembly 200 which may not be particularly illustrated in FIG. 2 include rounded corners on all interior surfaces of the components. In particular, the components such as the frame 209 and inner surfaces 205 of the detector housing 201 can be curved to facilitate reflection of fluoresced radiation to the PMT 105.

Moreover, the detector assembly 200 may incorporate limited amounts, and in some instances, no amount of adhesives or potting materials for securing the components together within the housing 101. Thus each of the components are removable from the detector housing 101 using standard tools, thus making the assembly field-serviceable. In accordance with one particular embodiment, the detector assembly 200 can be sealed from the external environment, such that the interior of the detector housing 101 can be a controlled atmosphere, which may be suitable for particular scintillators 103, including for example, inorganic crystalline scintillator materials that are particularly sensitive certain elements or compounds. The controlled atmosphere can contain minimal amounts of water and oxygen. In certain instances, the controlled atmosphere contains not greater than about 50 ppm of water, such as on the order of not greater than about 25 ppm, or even not greater than about 10 ppm water-containing species. Likewise, the controlled atmosphere can have oxygen contents of not greater than about 50 ppm, such as on the order of not greater than about 25 ppm or even not greater than about 10 ppm. Moreover, the controlled atmosphere can include an inert gas or combination of inert gas. For instance, the controlled atmosphere can include argon.

Figure 3A:
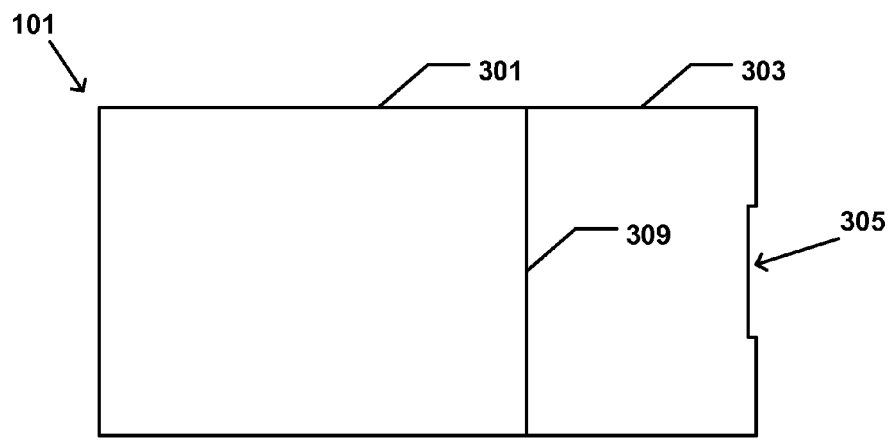
FIG. 3A includes a plan view of a portion of the detector in accordance with an embodiment.
Figure 3B:
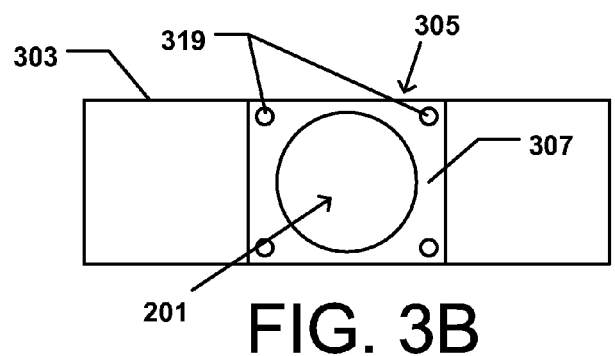
FIG. 3B includes a side view of a portion of the detector in accordance with an embodiment.

FIGS. 3A and 3B include views of the detector housing in accordance with embodiments. FIG. 3A is a plan view of the detector housing. In particular, the detector housing 101 is a segmented article including a first segment 301 and a second segment 303. The second segment 303 can be formed such that it is suitable for containing the PMT therein. In particular, the PMT 105 may extend through an opening proximate to the region 305 on the side of the second segment 303 and abut the side 309. In particular, the first segment 301 and the second segment 303 can be bonded together through an adhesive along the side 309 to form the full length of the detector housing 101. As such, the scintillator 103 can overlie the PMT 105 within the second segment 303.

FIG. 3B includes a side view of the second segment 303. In particular, the embodiment of FIG. 3B illustrates the opening 201 within the second segment 303 of the detector housing 101 suitable for engaging the PMT 105 therein. As illustrated, the bracket 307 can be attached to the side of the second segment 303 via openings 319 and use of fasteners. The bracket 307 can be configured such that it is suitable for engaging and holding the PMT 105 in its place within the second segment 303.

Figure 4:
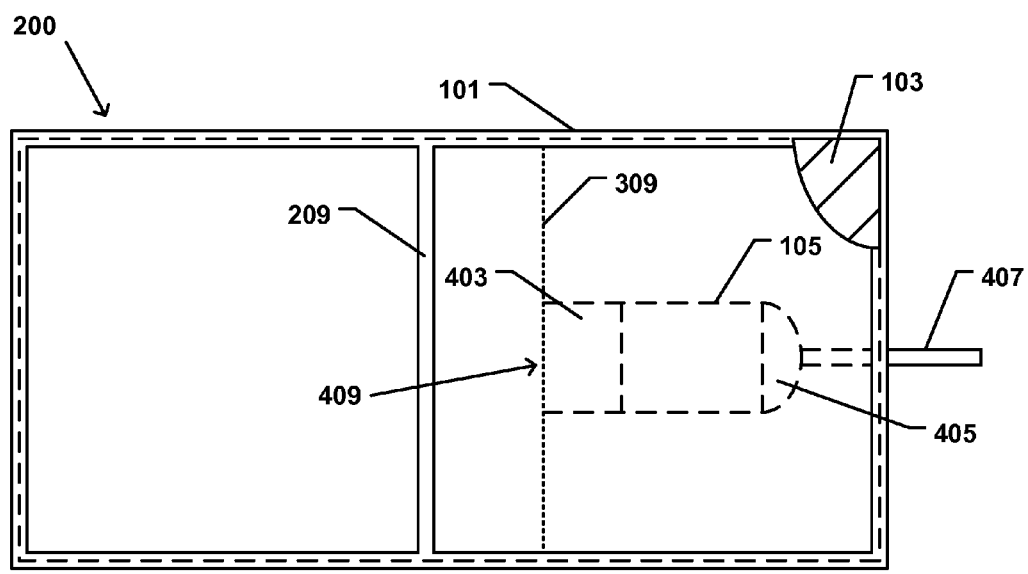
FIG. 4 includes a plan view of components as assembled within the detector in accordance an embodiment.

FIG. 4 includes a plan view of the components as assembled within the detector assembly. FIG. 4 further illustrates a portion of the scintillator 103 as it is intended to be contained within the detector housing 101. In particular, the scintillator 103 extends for substantially the full length and width of the detector housing and overlies the PMT 105.

FIG. 4 further illustrates the arrangement of the frame 209 as it overlies the scintillator 103 and the PMT 105. In particular, the PMT 105 extends into and is contained within the interior of the detector housing 101. In fact, the entire PMT 105 is contained within the interior of the detector housing and is underlying the scintillator 103.

In accordance with one embodiment, the PMT 105 includes a window 403 proximate to an end of the PMT 105 for gathering fluoresced radiation from the scintillator 103. In accordance with one particular embodiment, the window 403 can extend a certain distance from an end 409 of the PMT 105 and may further extend for a particular circumference around the cylindrical body of the PMT 105, and potentially around the entire circumference of the PMT body. As such, the window 403 may comprise a specific amount of the total surface area of the PMT 105, such that it is suitable for detecting radiation from a variety of different angles within the detector housing 101. In accordance with one particular embodiment, the window 403 comprises not greater than about 50% of the total surface area of the PMT 105. In other embodiments, the window 403 comprises not greater than about 40%, such as not greater than about 30%, not greater than about 20% or even on the order of not greater than about 10%, of the total surface area of the PMT 105. Particular embodiments utilize a PMT 105 having a window 403 that comprises between about 10% and about 40% of the total surface area of the PMT 105.

The PMT 105 can further include PMT electronics 405 coupled to the PMT 105 and configured to aid in the processing of the detected emissions. The PMT electronics 405 can include gain regulators such as voltage dividers and the like suitable for controlling the sensitivity of the PMT 105. Like the PMT 105, the PMT electronics 405 can be contained entirely within the interior of the detector housing 101. As further illustrated in FIG. 4, the PMT electronics 405 can be electrically connected to wires 407 which may extend through the wall of the detector housing 101.

EXAMPLE

The following comparative tests were completed to test the efficiency of a detector assembly formed according to embodiments herein versus a conventional detector assembly. In particular, the testing operation included the formation of a first sample formed according to an embodiment herein. Sample 1 included a detector housing having a reflective inner surface and 18 PMTs were placed within the detector housing, wherein each of the PMTs had a window that extended around a portion of the circumference and end such that the window comprises approximately 20% of the external surface of the PMT. The scintillator material was an organic scintillator material, commonly available from Saint-Gobain as BC-400, which was placed in the detector housing. The detector housing further included a window, gasket, and bezel according to embodiments herein.

A second sample was created using the same assembly as Sample 1, however, each of the 18 PMTs had a head-window configuration, such that the window was only located at the end of the window and did not overlap any portion of the circular sides of the PMT tube. At the end of each of the PMTs, an acrylic light pipe material was overlying each of the windows.

A beta ray source was used to emit beta rays at each of the samples, and the efficiency of each of the samples was tested. The actual number of beta ray emissions from the source was compared to the beta ray emissions detected by each of the detectors to develop a beta efficiency value, which is a percentage of the beta ray emissions actually detected by the PMTs.

The results of the data are summarized in Table 1 below. As indicated by the data, the detector assembly formed according to the embodiments herein has a vastly improved efficiency as compared to the conventional design. In fact, Sample 1 demonstrates an average beta efficiency that is nearly 90% greater efficiency than the conventionally designed detector.

TABLE 1

| PMT | Beta Efficiency (%) | |
|---|---|---|
| | Sample 1 | Sample 2 |
| 1 | 85.8 | 15.5 |
| 2 | 87.1 | 14.3 |
| 3 | 84.4 | 13.6 |
| 4 | 93.4 | 14.6 |
| 5 | 94.6 | 15.1 |
| 6 | 92.4 | 10.8 |
| 7 | 99.7 | 13.6 |
| 8 | 102.3 | 18.0 |
| 9 | 98.5 | 9.5 |
| 10 | 100.7 | 5.5 |
| 11 | 115.9 | 21.7 |
| 12 | 101.4 | 4.2 |
| 13 | 94.2 | 3.8 |
| 14 | 88.3 | 3.4 |
| 15 | 95.1 | 2.8 |
| 16 | 81.9 | 3.3 |
| 17 | 79.3 | 2.3 |
| 18 | 79.4 | 3.02 |
| AVG. | 93.0 | 9.7 |

The detector assembly described herein represents a departure from the state-of-the-art. For example, traditional detector assemblies generally incorporate a scintillator that is encased within its own casing having a light pipe at one end, typically made of acrylic, lucite, or a glass material, for transmitting the fluoresced radiation to an adjacent and separate housing wherein the PMT is contained. According to embodiments herein, the detector assembly includes a unitary detector housing which functions as a hollow, light-pipe for containing the scintillator and PMT therein. Notably, the detector assembly according to embodiments includes a combination of features including, but not limited to, a light-weight (i.e., low density) detector assembly, particularly shaped scintillators, reflective interior surfaces, and other design characteristics including windows, selective transmission layers, gaskets, bezels, and PMTs. Moreover, the assembly is a unitary design assembled in certain instances using removable fasteners (via common hand tools) or snap-fit connections minimizing the use of adhesives, making the article serviceable with common hand tools.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the abovedisclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A detector comprising:
   a detector assembly comprising:
      a detector housing comprising a reflective interior surface, reflective relative to a wavelength of fluoresced electromagnetic radiation, and an opening;
      a scintillator contained within the detector housing; and
      a photomultiplier tube (PMT) coupled to the detector housing, wherein the detector housing is configured to accept a portion of the PMT through the opening of the detector housing, such that a portion of the PMT is contained within the detector housing.

2. The detector of claim 1, wherein detector housing comprises a body and a coating comprising a reflective material overlying an interior surface.

3. The detector of claim 1, wherein the PMT comprises a window and the window is contained within the detector housing.

4. The detector of claim 3, wherein the PMT has a total surface area and the window comprises not greater than about 50% of the total surface area of the PMT.

5. The detector of claim 3, wherein the PMT has a cylindrical body and the window extends around a portion of a circumference of the cylindrical body.

6. The detector of claim 5, wherein the window extends around the entire circumference of the cylindrical body.

7. The detector of claim 1, wherein the detector housing comprises a thermoplastic polymer material.

8. The detector of claim 1, wherein the detector housing comprises a housing body having a rectangular shape.

9. The detector of claim 8, wherein the housing body has a volume of at least about 50 $cm^3$.

10. The detector of claim 9, wherein a majority of the volume within the detector assembly is open.

11. The detector of claim 1, wherein the detector assembly comprises a selective transmission layer.

12. The detector of claim 11, wherein the selective transmission layer comprises an organic material.

13. The detector of claim 12, wherein the selective transmission layer comprises a polyester.

14. The detector of claim 11, wherein the selective transmission layer substantially surrounds the scintillator within the detector housing.

15. The detector of claim 1, wherein the scintillator has a rectangular body comprising a length, width, and thickness, wherein the length$\geq$width$\geq$thickness.

16. The detector of claim 15, wherein the scintillator has a thickness of not greater than about 2 mm.

17. The detector of claim 1, wherein the scintillator is positioned on a shelf within the detector housing and the PMT underlies the scintillator.

18. A detector comprising:
   a rigid detector assembly comprising:
      a detector housing comprising an opening, wherein a majority of the volume within the detector assembly is open;
      a scintillator contained within the detector housing; and
      a photomultiplier tube (PMT) coupled to the detector housing, wherein the detector housing is configured to accept a portion of the PMT through the opening of the detector housing, such that a portion of the PMT is contained within the detector housing, and wherein the rigid detector assembly comprises a density of not greater than about 0.8 $g/cm^3$.

19. The detector of claim 18, wherein the detector housing comprises reflective interior surfaces that are reflective relative to a wavelength of fluoresced electromagnetic radiation from the scintillator.

20. A detector comprising:
   a rigid detector assembly comprising:
      a detector housing comprising an opening, wherein a majority of the volume within the detector assembly is open;
      a scintillator contained within the detector housing; and
      a photomultiplier tube (PMT) coupled to the detector housing, wherein the detector housing is configured to accept a portion of the PMT through the opening of the detector housing, such that a portion of the PMT is contained within the detector housing, and wherein the scintillator and PMT are separated by open space.

* * * * *